United States Patent [19]

Lecron et al.

[11] 4,401,451
[45] Aug. 30, 1983

[54] PROCESS AND APPARATUS FOR THE MANUFACTURE OF DISCONTINUOUS GLASS FIBERS

[75] Inventors: Jacques Lecron, Eaux; Maxime Manera, Bellecombette; Jean-Paul Faure, Chignin; Jean-Pierre Renaudin, Cognin, all of France

[73] Assignee: Societe Vetrotex Saint-Gobain, Chambery, France

[21] Appl. No.: 374,479

[22] Filed: Mar. 3, 1982

Related U.S. Application Data

[63] Continuation-in-part of Ser. No. 207,712, Nov. 17, 1980, abandoned.

[30] Foreign Application Priority Data

Nov. 20, 1979 [FR] France ............................. 79 28538
May 19, 1981 [FR] France ............................. 81 09911

[51] Int. Cl.³ ........................................... C03B 37/035
[52] U.S. Cl. ................................................. 65/1; 65/2; 65/5; 65/16
[58] Field of Search .......................... 65/1, 5, 16, 2

[56] References Cited

U.S. PATENT DOCUMENTS

| 2,286,903 | 6/1942 | Dockerty | 49/17 |
| 3,021,558 | 2/1962 | Roberson | 18/25 |
| 3,532,479 | 10/1970 | Stalego | 65/16 |
| 3,574,581 | 4/1971 | Strickland et al. | 65/1 |
| 3,697,241 | 10/1972 | Strickland et al. | 65/2 |
| 3,773,483 | 11/1973 | Schmidt | 65/5 X |
| 3,905,790 | 9/1975 | Strickland | 65/2 |
| 4,328,015 | 5/1982 | Melan et al. | 65/2 |
| 4,349,364 | 9/1982 | Morrison | 65/2 |

FOREIGN PATENT DOCUMENTS

| 665802 | 1/1952 | United Kingdom | 65/5 |
| 727583 | 4/1980 | U.S.S.R. | 65/16 |

Primary Examiner—Robert L. Lindsay, Jr.
Attorney, Agent, or Firm—John T. Synnestvedt; Charles H. Lindrooth

[57] ABSTRACT

The application discloses an apparatus and a process for the manufacture of discontinuous fibers obtained by fluid attenuation. The fibers are attenuated from a bushing whose base is equipped with a substantially continuous plate having a hollowed upper surface of alveoles, said alveoles being perforated with orifices, and whose lower side is cut with grooves defining bosses, each boss being provided with one or several alveoles. The fibers produced are particularly adapted for use in the form of mat, sheet or roving.

19 Claims, 13 Drawing Figures

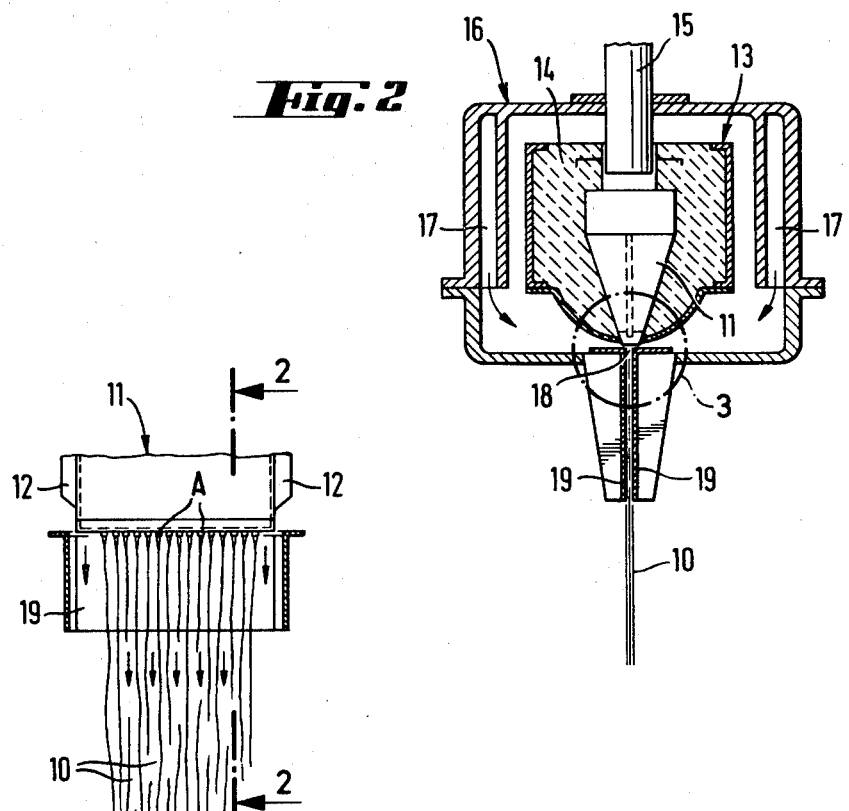
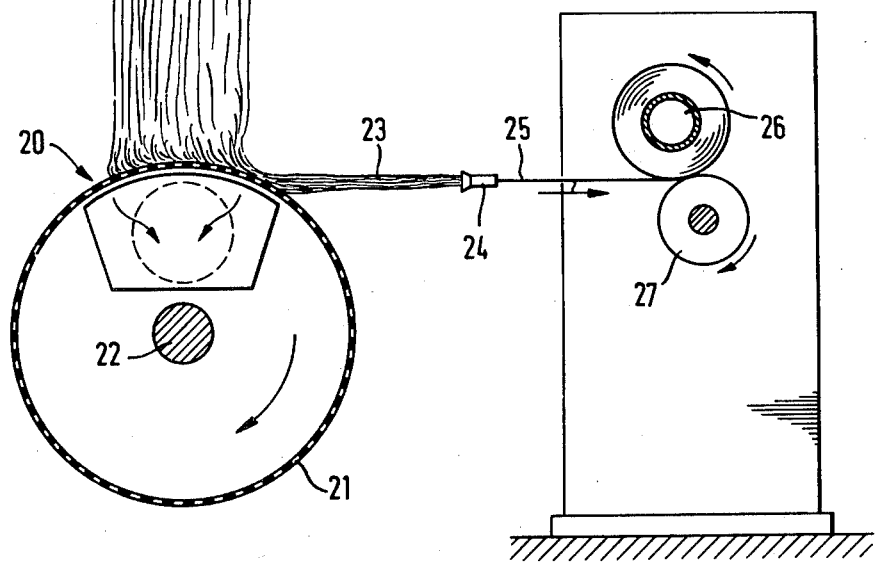

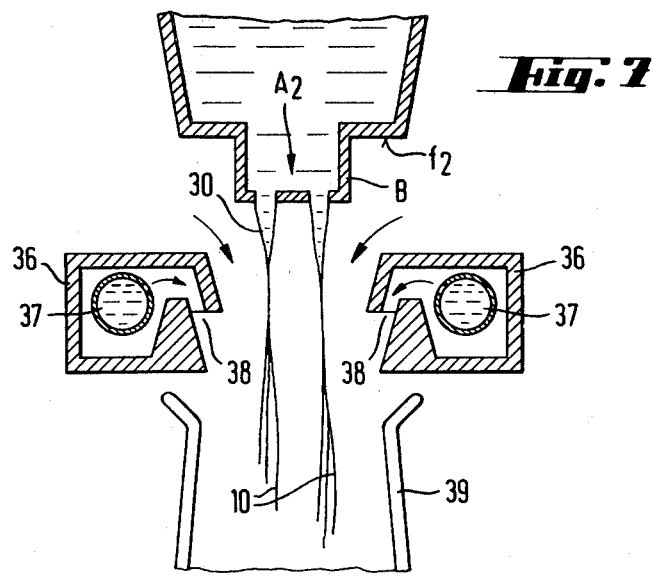
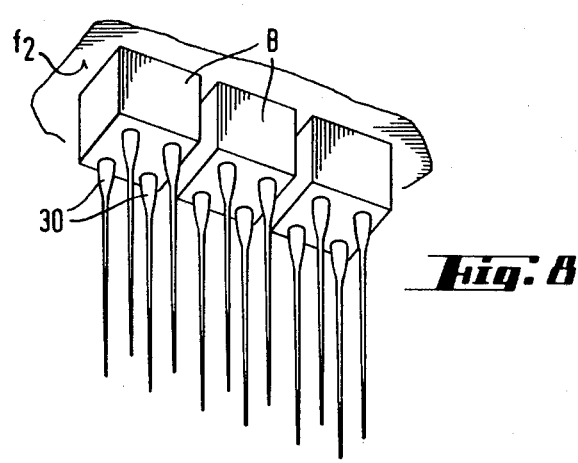
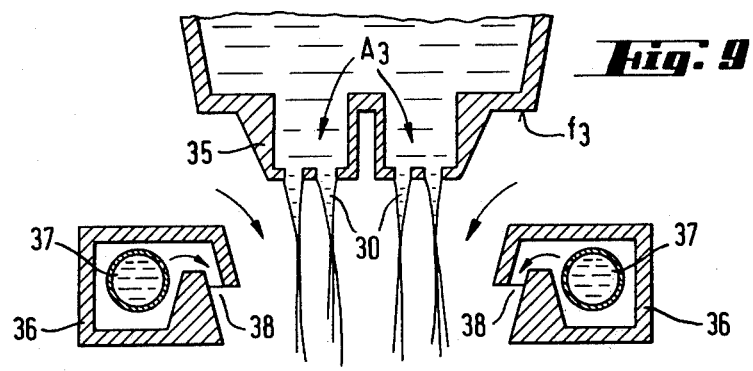

PROCESS AND APPARATUS FOR THE MANUFACTURE OF DISCONTINUOUS GLASS FIBERS

CROSS REFERENCES

This application is a continuation-in-part of our prior application Ser. No. 207,712, filed Nov. 17, 1980, now abandoned in favor of application Ser. No. 377,903, filed May 13, 1982, as a continuation of said earlier filed application. This application is also related to co-pending applications Ser. Nos. 374,272 and 374,478 filed on May 3, 1982 in the name of the same inventors as in this application.

BACKGROUND AND STATEMENT OF OBJECTS

This invention relates to a process and an apparatus for the manufacture of fibers of mineral materials such as glass, delivered through orifices in the bottom of a bushing. It is especially useful in the manufacture of long discontinuous fibers used in the formation of a sheet or pad or gathered into the form of a band or cord; and the invention provides for increase in the number of orifices in the bushing and thus of the number of attenuable streams delivered from the bushing.

The most commonly used technique of fiberization for the manufacture of this type of fibers consists of subjecting a multiplicity of streams of molten vitreous material to the action of an attenuating gas stream. These glass streams issue from a multiplicity of small tubes, each having a single orifice and arranged so that the streams project from the lower surface of the bottom of a bushing.

These tubes, commonly known as tips, provide for the stable separation of the streams of material and generally prevent the well-known phenomenon of "flooding", i.e., spreading of the molten material over the lower surface of the bottom of the bushing.

Such a process of manufacture has been described in particular in the following U.S. Pat. Nos: 2,206,058; 3,207,587; 3,607,164 and 3,836,346.

Prior techniques for carrying out this process of manufacture all have certain features in common, as follows:

The bushing used, generally made of a platinum alloy, has a flat bottom in the form of a very elongated rectangle provided with one to three longitudinal rows of tips. The bushing provides for maintenance of the desired temperature of the molten material being fiberized and may also be relied upon for melting the material, in which latter event, the vitreous material is introduced into the bushing in solid state, these techniques being already well-known to the man skilled in the art.

Two blowers have commonly been used, arranged one on each side of the long edges of the bottom of the bushing and each directing a gas at or below the level of the said bottom. The patents cited above give examples of such blowers placed below the bottom of the bushing; these blowers have slots or nozzles directed downwardly and converging on the vertical plane passing through the longitudinal axis of the said bushing.

The streams of glass issuing from the tips are attenuated into fibers, usually long discontinuous fibers, under the action of the gas currents leaving these slots or nozzles at a high velocity.

The prior art arrangements have two major disadvantages which limit the life of each bushing and the quantity of fibers produced from it.

The tips which channel the glass at the outlet of the bushing occupy a considerable amount of space at the bottom of said bushing; but in order that the action of the gas currents may be effective, the width, and consequently, the useful surface area of the bottom of the bushing is necessarily minimized. Due to these two limitations, the number of tips per bushing is not much more than about 100 in the arrangements of the prior art.

Furthermore, the gas currents used for attenuation cause a strong induction of air along and between the tips. The consequent air friction over the walls of these tips results in rapid wear and considerably shortens the life of the bushing.

U.S. Pat. No. 3,836,346 proposes a solution for overcoming one of the above-mentioned disadvantages. It consists of using tips which are perforated asymmetrically in such a manner that the portion of the lateral wall presented outwardly is thicker than that presented towards the vertical plane passing through the longitudinal axis of the bushing. While not eliminating the erosive action of the violent air currents produced during fiberization, this structure delays the consequences and increases the life of the bushings. This solution does not provide for an increase in the density of the orifices.

The present invention has as its object a process and an apparatus capable of improving the manufacture of fibers, particularly relatively long but discontinuous fibers.

It has more particularly the object of increasing the number of streams of molten material capable of being attenuated from a bushing and, at the same time, increasing the life of the bushing.

These objects are achieved by the use of a novel form of bushing in a fiberizing installation such as that defined below.

The fiberizing installation essentially comprises a source of thermoplastic material such as glass, a bushing of elongated form heated by Joule's effect, apparatus for attenuation by blowing arranged to cause gas flow over the bottom surface of the bushing and also downwardly from the bottom surface to effect attenuation of glass streams leaving the perforations in the bushing. In certain embodiments, blowers are placed parallel to the vertical plane passing through the longitudinal axis of the bushing and on both sides of the bottom of said bushing, with the openings of said blowers directed downwardly. Means for receiving the fibers obtained are also provided.

The bottom of the bushing according to the invention has a substantially continuous wall area or areas perforated by a multiplicity of orifices, without the presence of tips.

According to one of the characteristics of the invention, the bottom of the bushing is equipped with a wall having an upper surface hollowed out by cells or alveoles, each alveole having a lower wall perforated by a plurality of orifices, while the lower surface of the wall preferably has grooves cut into it to provide a separation of the lower wall surface surrounding the orifices for one alveole from the lower wall surface surrounding the orifices for adjacent alveoles.

BRIEF DESCRIPTION OF DRAWINGS

The invention is described in detail below with reference to the attached drawings, in which:

FIG. 1 is a side view of portions of a fiberizing installation in which a bushing according to the invention is adapted to be used;

FIG. 2 is a partial vertical section taken on the line 2—2 of FIG. 1 but also illustrating certain devices associated with the bushing but not shown in FIG. 1;

FIG. 7 is a vertical transverse section through a bushing and associated equipment according to a third embodiment of the invention;

FIG. 8 is a perspective view of a portion of the bottom of the bushing represented in FIG. 7;

FIG. 9 is a vertical transverse section through a bushing according to a fourth embodiment of the invention;

DETAILED DESCRIPTION OF DRAWINGS

Figure 3:
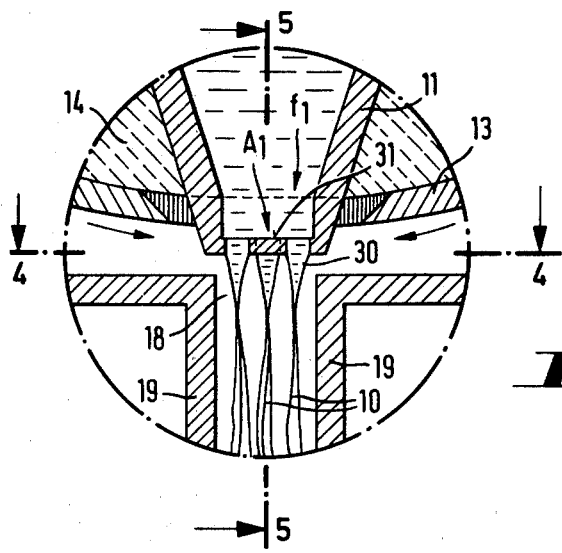
FIG. 3 is an enlarged view showing certain details of the preceding figure.

FIG. 1 illustrates only certain components of the first embodiment of the bushing but also shows fiber-collecting equipment with which the bushing is associated. FIG. 2 shows additional features of the bushing and its immediate surroundings, but does not illustrate the fiber-collecting equipment.

As shown in FIGS. 1 and 2, discontinuous filaments 10 are produced by attenuation of streams of molten material issuing from the bushing 11.

The bushing 11, generally manufactured from a platinum alloy, is heated by Joule's effect from current supplied at the terminals 12. The bottom of the bushing 11 has alveoles or cells $A_1$ (see FIGS. 3, 4 and 5) hollowed into the upper surface of a flat wall, each alveole having several orifices extending through the bottom.

The bushing 11 is placed in an enclosure 13 (see FIGS. 2 and 3) filled with refractory material 14. It is completely surrounded by this refractory material except at the bottom, where it extends slightly below an opening formed in the lower part of the enclosure 13. In the manufacture of glass fibers, the bushing is supplied with glass marbles or glass in molten form through delivery tube 15.

The enclosure 13 is, in turn, surrounded by a chamber 16 provided with at least two intake pipes 17 for a gas under pressure, one arranged at each side of the bushing.

The gas, circulation of which is indicated by arrows, issues from the lower part of the chamber 16 adjoining the bottom of the bushing through an opening 18.

This opening 18, which extends along the whole length of the bottom of the bushing 11, is bounded by walls 19 commonly known as skirts. These skirts serve to guide the discontinuous fibers 10 and reinforce and control the action of the attenuating gas.

Referring to FIG. 1, the fibers are projected over the surface of the zone 20 of a perforated drum 21 rotating about a shaft 22, and are deposited in the zone 20 under the localized action of air suction produced by means known to the man of the art.

The stream of fibers 23 is delivered to twisting means 24 and is converted into a cord 25 which is wound on a rotating support 26 driven by the friction from a drive spindle 27.

The fiberization installation described above is given only by way of example. The bushings according to the invention may equally well be used with blower apparatus arranged on both sides of and below the phase passing through the outlet of the orifices from which the glass streams emerge, and is illustrated in other figures of the drawings, and described herebelow.

The structure of the bushings according to the invention will now be described in detail with reference to FIGS. 3 to 13, which illustrate several different embodiments.

FIG. 3, which shows a detail of FIG. 2, represents the fiberizing zone. In this zone, the base of the bushing 11 extending below the enclosure 13 is exposed to the action of fluid under pressure, which causes the molten material to flow out in the form of streams 30 and thins them out into discontinuous fibers 10. The streams 30 flow out through several orifices provided in the wall which forms the base of the alveole $A_1$.

This alveole $A_1$ is formed by a cylindrical cavity hollowed out of the upper surface of a flat plate, which upper surface is delimited by the plane $f_1$. The base of this alveole is formed by a wall 31 provided with four orifices. The lateral walls, which bound the alveoles parallel to the long sides of the bushing, are inclined and situated in the continuation of the said sides. The adjacent alveoles are separated by a wall 32. The lower surface of the flat plate may advantageously have transverse grooves 33 subdividing the bottom of the bushing, each subdivision being provided with a single alveole.

Figure 4:
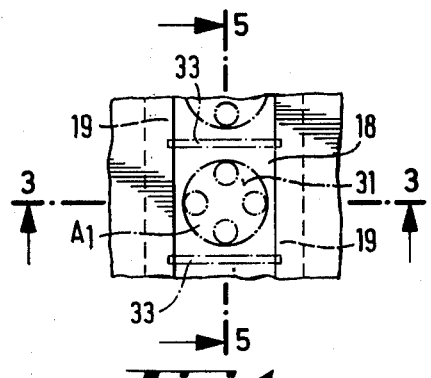
FIG. 4 is a plan view taken generally as indicated by the section line 4—4 on FIG. 3.
Figure 5:
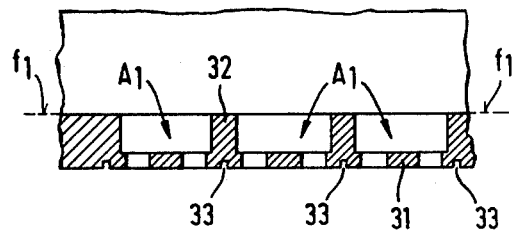
FIG. 5 is a longitudinal vertical section through the bottom of the bushing taken on the line 5—5 of FIGS. 3 and 4.

In the embodiment illustrated in FIGS. 3 to 5, the bushing 11 has a single row of alveoles which are independent of one another and spaced longitudinally of the bushing.

Figure 6:
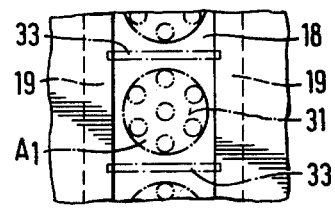
FIG. 6 is a view similar to FIG. 3 but illustrating a bushing according to a second embodiment of the invention.

These elveoles may have a larger number of orifices, as shown in FIG. 6.

FIGS. 7 to 13 illustrate further examples of bushings according to the invention.

Figure 13:
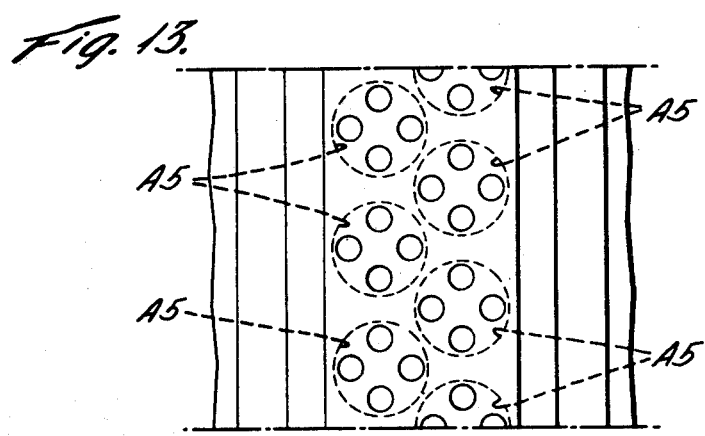
FIG. 13 is a view similar to FIG. 11, taken as indicated by the line 13—13 on FIG. 12.

If the bottom of the bushing is wider, it may be provided with a double row of alveoles in staggered relation, as is shown in FIG. 13.

As seen in FIGS. 7 and 9, the bushings have alveoles (preferably cylindrical) hollowed out of the upper surfaces bounded by the planes $f_2$ and $f_3$ of walls forming the bottom of the bushing.

In the embodiment of FIGS. 7 and 8, the internal cylindrical alveoles $A_2$ are bounded by prismatic bosses B, for instance, of square cross section. The wall forming the base of each of said alveoles is provided with four orifices through which the streams of molten material 30 flow out.

FIG. 9 illustrates another embodiment, incorporating a bushing, the bottom of which is equipped with a double row of alevoles A₃. These alveoles A₃ are distinguished in particular from the alveoles A₂ by their side walls which are parallel to the long sides of the bushing. These walls 35 may be inclined, thereby facilitating the flow of air and reducing the rate of wear (of the said walls). As in FIG. 3, they may be attached at the line of junction of one of the side walls of the bushing and the bottom.

FIGS. 7 and 9 also illustrate schematically that the bushings may be used with blowers for attenuation by gas streams arranged below the fiberization plane. These blowers 36 each comprise a feedpipe 37 for gas under pressure and a series of downwardly directed nozzles or slots 38. The streams 30 of molten material are attenuated into discontinuous fibers 10 by the combined action of the blasts delivered by the blowers and the air induced by the blasts. These fibers are channelled by the walls of a hood 39, and then collected in the form of a sheet or mat, for example, on a known type of conveyor belt (not shown), in order to form a mat or pad.

Figure 10:
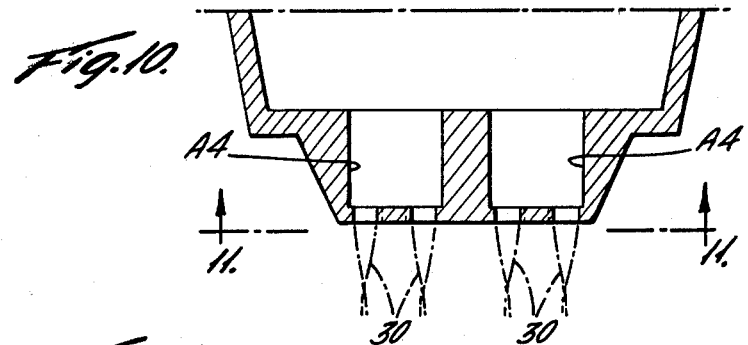
FIG. 10 is a fragmentary vertical sectional view through a fifth embodiment of a bushing according to the invention.
Figure 11:
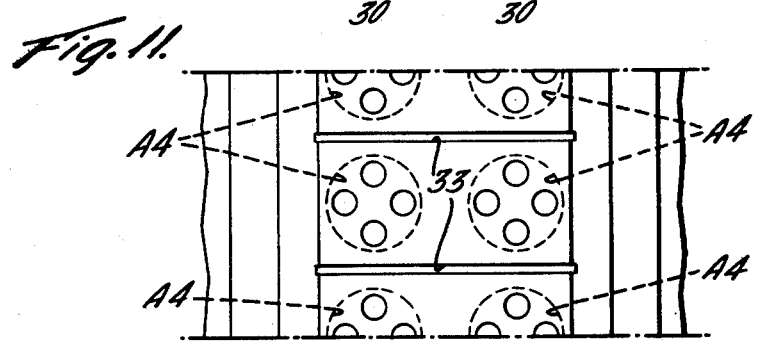
FIG. 11 is a bottom view of a portion of the bushing according to FIG. 10, this view being taken as indicated by the line 11—11 on FIG. 10.

FIGS. 10 and 11 illustrate another embodiment of bushing which may be used according to the invention. Here, the bottom wall of the bushing has two rows of alveoles A₄, each with a group of orifices, the alveoles of the two rows being arranged in pairs in side-by-side relation. In this embodiment, the bottom surface of the bottom wall is provided with grooves 33 which are arranged between the pairs of alveoles.

Figure 12:
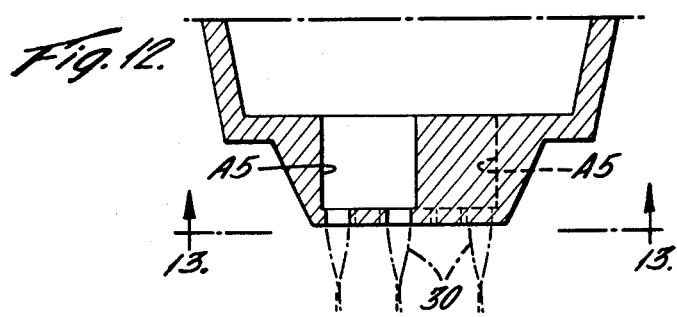
FIG. 12 is a view similar to FIG. 10 but showing a sixth embodiment of the bushing.

In FIGS. 12 and 13, two rows of alveoles A₅ are provided, but, instead of being in side-by-side pairs, the alveoles in FIGS. 12 and 13 are staggered.

In the various examples described above, the orifices in the wall enclosing each alveole form a group of orifices.

In each group of orifices, the edge-to-edge distance between the orifices may vary from 1 mm to 0.2 mm or even less but is preferably in the range of 0.2 to 0.5 mm.

The grooves separating two adjacent bosses have a width of at least 0.1 mm but preferably 0.4 to 1.5 mm. Grooves 1 mm wide by 1 mm deep produce satisfactory results.

The mode of operation of the bushings according to the invention is as follows:

The mineral material, for example glass, is delivered into the bushing either in the solid or the molten state. The bushing melts the glass and/or adjusts it to the required temperature for formation of the fibers.

The molten glass is subdivided into a multiplicity of portions each flowing into one alveole. The glass flows out through the various orifices in the wall forming the base of each alveole and initially partially coats this wall.

The blower apparatus is put into operation; and at least one stream of glass per alveole is thus formed independently from each alveole by attenuation effected by the gas flow, and each stream is then subdivided into as many filaments as there are orifices.

The alloy of which the bushing is constructed is generally a platinum alloy with a rhodium content of 10%; and if the glass employed is the well-known E glass, the angle of contact between the bottom surface of the bushing and the molten glass at 1150° C. is less than 40°.

Alloys providing an angle of contact greater than 40° and even greater than 60° may also be used for the walls encircling the alveoles and more particularly for the wall enclosing each alveole. This has the effect of reducing the glass coating or "flooding" of the lower external surface of this wall with the molten glass. A ternary alloy marketed as PR 3/4 by COMPTOIR-LYON-ALEMAND-LOUYOT, 13 rue de Montmorency, 75003 Paris, France, may thus be used. This alloy, which contains 93% platinum, 3% iridium and 4% gold, makes an angle of 75° with E glass at a temperature of 1150° C.; and this facilitates subdivision of the delivered glass into separate streams and filaments for each perforation.

The same effect may also be obtained by coating the lower external surface of the wall enclosing each alveole with a material which is only very slightly wetted by molten glass, such as boron nitride.

Although the bottom of the bushing is shown as flat in each of the embodiments shown in the drawings, other substantially continuous shapes may be employed.

We claim:

1. Apparatus for the manufacture of fibers from a molten mineral material such as glass, comprising a supply source of glass, a bushing heated by Joule's effect, the bottom of which bushing has an elongated rectangular form, with perforations delivering a multiplicity of streams of molten material, apparatus for attenuating the glass streams comprising blower means delivering gas streams generally parallel to the vertical plane passing through the longitudinal axis of the bushing, the blower means delivering streams of gas substantially vertically downwardly at the level of said bottom or immediately below it on both sides of said bottom and means for receiving the said fibers, characterized in that the bottom of the bushing is equipped with a wall, the lower surface of which is free of projections in the portions extended between the perimeters of a multiplicity of orifices.

2. Apparatus according to claim 1, characterized in that the said bottom is hollowed out by alveoles, the bottom of which, in turn, being perforated by a plurality of orifices, the orifices being in groups, each group being in communication with an alveole.

3. Apparatus according to one of claims 1 or 2, characterized in that the alveoles are cylindrical and are distributed in staggered formation.

4. Apparatus according to one of claims 1 or 2, characterized in that the bottom of the bushing is equipped with a wall having grooves cut in its lower surface to define bosses, each provided with a plurality of alveoles.

5. Apparatus according to claim 2 wherein the alveoles are cylindrical and are distributed in staggered fashion.

6. Apparatus according to one of claims 1 or 2, characterized in that the bottom wall of the bushing is provided with grooves cut into its lower surface, said grooves separating the region surrounding the orifices in communication with one alveole from the regions surrounding the orifices in communication with other alveoles.

7. Apparatus according to claim 6, characterized in that in horizontal section, the external form of the bosses is different from the form of the corresponding alveole.

8. Apparatus according to claim 7 characterized in that the lower external surface of each boss is square.

9. Apparatus according to claim 6, characterized in that the lower external surface of each boss is square.

10. Apparatus according to claim 6, characterized in that the side walls of the bosses are substantially vertical.

11. Apparatus according to one of claims 4 or 6, characterized in that the thickness of the wall of the bosses decreases at a uniform rate from their point of connection to the bottom of the bushing to their lower surface.

12. Apparatus according to claim 10, characterized in that at least one of the side walls of the bosses is directly connected at one of the lines of connection between the bottom of the bushing and the side walls of the said bushing.

13. Apparatus according to claim 2, characterized in that the perforated wall forming the bottom of the alveoles consists of a metal alloy providing an angle of contact greater than 60° with molten glass at 1150° C.

14. Apparatus according to claim 2, characterized in that the lower external surface of the perforated wall forming the base of the alveoles is coated with a substance providing an angle of contact greater than 60° with molten glass at 1150° C.

15. Apparatus for the manufacture of fibers from a molten thermoplastic material such as glass, comprising a bushing for establishing a supply of molten thermoplastic material, the bushing having a bottom wall of elongated rectangular form, with perforations for delivering a multiplicity of streams of molten material, and mechanism for attenuating the streams of molten material to form fibers, comprising blower means effecting gas flow substantially downwardly at the level of the bottom and below the bushing downwardly along the streams of molten material, the bottom of the bushing having downwardly exposed surfaces which are free of projections in the portions extended between the perimeters of a multiplicity of orifices.

16. Apparatus according to claim 15 wherein the wall portions are planar.

17. Apparatus as defined in claim 15 in which the blower means is arranged to deliver a pressurized stream of gas is a path one portion of which approaches the perforated bottom of the bushing at an edge of said bottom wall and a subsequent portion of which extends in a downward direction away from said bottom wall.

18. Apparatus as defined in claim 15 in which the blower means is arranged to deliver a pressurized stream of gas in a downward direction along the streams of molten material delivered from the perforations in the bottom of the bushing, the blower means being positioned in spaced relation below the bottom of the bushing and providing for induction of ambient gas in a path approaching an edge of said bottom wall.

19. Process for the manufacture of discontinuous fibers of a mineral material such as glass, supplied to a metal bushing, by attenuation of said material by a gas stream, said discontinuous fibers being formed from a plurality of streams of molten material flowing out of the bottom of said metal bushing, characterized in that the molten glass is subdivided into a multiplicity of flow paths, each supplying an alveole hollowed out of the upper surface of a wall forming the bottom of the bushing, each alveole having, in turn, several orifices extending through said wall, partially coating the lower external surface of said wall with glass as glass flows out through said orifices, and forming at least one stream of glass from a plurality of orifices for each alveole independently at each alveole, by attenuation by gas flow, and thereafter causing said stream to subdivide into as many filaments as there are orifices per alveole.

* * * * *